(12) United States Patent
Gresset et al.

(10) Patent No.: US 9,756,029 B2
(45) Date of Patent: Sep. 5, 2017

(54) METHOD AND SYSTEM FOR AUTHENTICATING AT LEAST ONE TERMINAL REQUESTING ACCESS TO AT LEAST ONE RESOURCE

(71) Applicant: MITSUBISHI ELECTRIC CORPORATION, Tokyo (JP)

(72) Inventors: Nicolas Gresset, Rennes (FR); Herve Bonneville, Rennes (FR)

(73) Assignee: Mitsubishi Electric Corporation, Tokyo (JP)

( * ) Notice: Subject to any disclaimer, the term of this patent is extended or adjusted under 35 U.S.C. 154(b) by 112 days.

(21) Appl. No.: 14/438,157

(22) PCT Filed: Nov. 1, 2013

(86) PCT No.: PCT/JP2013/080365
§ 371 (c)(1),
(2) Date: Apr. 23, 2015

(87) PCT Pub. No.: WO2014/080780
PCT Pub. Date: May 30, 2014

(65) Prior Publication Data
US 2015/0249653 A1    Sep. 3, 2015

(30) Foreign Application Priority Data

Nov. 21, 2012   (EP) .................................. 12193627

(51) Int. Cl.
*G06F 7/04*   (2006.01)
*G06F 15/16*   (2006.01)
(Continued)

(52) U.S. Cl.
CPC .............. *H04L 63/08* (2013.01); *H04L 63/02* (2013.01); *H04L 63/0884* (2013.01); *H04L 63/10* (2013.01); *H04W 12/06* (2013.01)

(58) Field of Classification Search
CPC ....................................................... H04L 63/10
(Continued)

(56) References Cited

U.S. PATENT DOCUMENTS 5,663,896 A * 9/1997 Aucsmith ............. H04L 9/0822
                                                          380/279
6,944,765 B1 * 9/2005 Rose ........................ G06F 21/31
                                                          380/201
(Continued)

FOREIGN PATENT DOCUMENTS

CN       101557406 A    10/2009
JP       2011-139113 A   7/2011

OTHER PUBLICATIONS

3GPP TR 33.821 V9.0.0 (Jun. 2009), "3rd Generation Partnership Project; Technical Specification Group Services and System Aspects; Rationale and track of security decisions in Long Term Evolved (LTE) RAN/3GPP System Architecture Evolution (SAE) (Release 9)", Jun. 1, 2009, pp. 1-148.

(Continued)

*Primary Examiner* — Taghi Arani
*Assistant Examiner* — Khalil Naghdali
(74) *Attorney, Agent, or Firm* — Birch, Stewart, Kolasch & Birch, LLP (57) ABSTRACT

For authenticating at least one terminal requesting access to at least one resource, an authentication server performs: obtaining for each terminal at least one piece of authentication information; transmitting to a gateway device at least one checking function, or coefficients thereof. Each piece of authentication information is representative of a value such that, when inputted to respective checking function(s), the checking function(s) return(s) a predefined value. The gateway device performs: receiving from one terminal a request for getting access to the resource(s), said request being received in conjunction with a piece of authentication infor- (Continued)

mation; retrieving a checking function applicable to the received request; inputting the piece of authentication information provided by the terminal into the retrieved checking function, for obtaining an authentication result; accepting the request for getting access to the resource(s), when the authentication result equals said predefined value; and rejecting the request otherwise.

12 Claims, 6 Drawing Sheets

(51) Int. Cl.
    *G06F 17/30*     (2006.01)
    *H04L 29/06*     (2006.01)
    *H04W 12/06*     (2009.01)

(58) Field of Classification Search
    USPC ............................................................ 726/7
    See application file for complete search history.

(56) References Cited

U.S. PATENT DOCUMENTS

| 2005/0086484 | A1* | 4/2005 | Muratani | G06T 1/005 |
| | | | | 713/176 |
| 2005/0210258 | A1* | 9/2005 | Birrell | H04L 12/585 |
| | | | | 713/178 |
| 2007/0169177 | A1* | 7/2007 | MacKenzie | H04L 63/08 |
| | | | | 726/3 |
| 2007/0230692 | A1* | 10/2007 | Akiyama | H04L 9/3093 |
| | | | | 380/44 |
| 2012/0117239 | A1* | 5/2012 | Holloway | H04L 61/1511 |
| | | | | 709/226 |

OTHER PUBLICATIONS

Cao et al., "A simple and robust handover authentication between HeNB and eNB in LTE networks", Feb. 21, 2012, Computer Networks 56, Elsevier Science Publishers, pp. 2119-2131.

\* cited by examiner

METHOD AND SYSTEM FOR AUTHENTICATING AT LEAST ONE TERMINAL REQUESTING ACCESS TO AT LEAST ONE RESOURCE

The present invention generally relates to authenticating at least one terminal requesting access to at least one resource, the access to the resource(s) being managed by an authentication server, a gateway device including means for routing data between the terminal(s) on one hand and, on the other hand, the authentication server and the resource(s).

Accesses to resources may be authorised to a terminal thanks to the use of an authentication server. Typically, an authentication server manages the access authorisation for plural resources.

Such resources are for example wireless communication time and/or frequency resources, which means that access control to the resources relates to a hand-over procedure or to an establishment of cooperation schemes between two radio neighbours. According to another example, such resources are computational resources of a server for cyber-foraging applications, or cloud computing. According to yet another example, the resources are data stored on a data server or information stored by another terminal, like a sensor, or may be an application executed by another terminal.

In order to allow a centralised management of such resources, a gateway device includes means for routing data between the terminal, the authentication server and the aforementioned resources. Typically, the terminal transmits to the gateway device a request for getting access to a certain resource. Once, the gateway device detects that accessing the resource by the terminal requires authentication, the gateway device requests to the authentication server whether the terminal is allowed to rightfully get access to the resource. The authentication server then performs authentication of the terminal and if the authentication of the terminal fails, the authentication server rejects the request from the gateway device, which in turn rejects the request from the terminal. Otherwise, the authentication server accepts the request from the gateway device, which in turn accepts the request from the terminal, and the access to the resource is thus granted to the terminal.

Let's consider for instance a case where the resource relates to a handover in the context of 3GPP LTE (Long-Term Evolution) specifications. UEs (User Equipments) are served by a core network via base stations, also referred to as eNodeBs. Each eNodeB manages a cell, wherein a cell is an area for which UEs located in the cell can be handled by the concerned base station, i.e. can communicate with a remote telecommunication device by accessing the core network via the base station. Each eNodeB is therefore considered as a gateway device, which includes means for routing data between the UEs, the core network entities and neighbouring eNodeBs. Handover takes place when a UE moves from one cell managed by a first base station to another managed by a second base station. The access to the cell served by the second base station may be restricted to a predefined set of subscribers (CSG for Closed Subscriber Group). In this case, the handover is performed via an authentication server, referred to as MME (Mobility Management Entity), in order to perform cell access control. The MME is therefore in charge of managing the access to the resource(s) that the cell served by the second base station represents.

However performing systematic authentication via the authentication server is time-consuming and is moreover network resources consuming, as it requires many exchanges between the gateway devices and the authentication server, especially in case of numerous parallel requests for getting access to resources managed by the authentication server. Performing systematic authentication via the authentication server is moreover processing resource consuming on the authentication server side.

It is desirable to overcome the aforementioned problems of the state of the art.

In particular, it is desirable to provide a solution that allows reducing the time needed to perform authentication of a terminal requesting access via a gateway device to at least one resource of which access is managed by an authentication server connected to the gateway device.

It is furthermore desirable to provide a solution that allows offloading processing from the authentication server, while ensuring the adequate level of access control, which may change over time, and while ensuring non-traceability of terminals, i.e. ensuring that entities other than the authentication server are not able to build an history of accesses by a given terminal to the resource(s).

It is furthermore desirable to provide a solution that is easy-to-implement and that is cost-effective.

To that end, the present invention concerns a method for authenticating at least one terminal requesting access to at least one resource, the access to the resource(s) being managed by an authentication server, a gateway device including means for routing data between the terminal(s) on one hand and, on the other hand, the authentication server and the resource(s). The method is such that the authentication server performs: obtaining for each terminal at least one piece of authentication information; transmitting to the gateway device at least one checking function, or coefficients thereof; wherein each piece of authentication information is representative of a value such that, when inputted to respective checking function(s), the checking function(s) return(s) a predefined value. The method is further such that the gateway device performs: receiving from one terminal a first request for getting access to the resource(s), said first request being received in conjunction with a piece of authentication information provided by the terminal; retrieving a checking function applicable to the received request, from amongst the checking function(s) received from the authentication server; inputting the piece of authentication information provided by the terminal into the retrieved checking function, for obtaining an authentication result; accepting the first request for getting access to the resource(s), when the authentication result equals said predefined value; and rejecting the first request for getting access to the resource(s), when the authentication result differs from said predefined value. Thus, the time needed to perform authentication of the terminal requesting access via the gateway device to the resource(s) of which access is managed by the authentication server connected to the gateway device is reduced. Moreover, the adequate level of access control is ensured.

According to a particular feature, the authentication server performs: determining, for each terminal, said piece(s) of authentication information; transmitting to each terminal the respective piece(s) of authentication information. Thus, the authentication server can perform authentication offloading in a flexible manner.

According to a particular feature, the authentication server performs: determining more than one piece of authentication information per terminal, each piece of authentication information being representative of a value such that, when inputted to each checking function determined for the terminal, said determined checking function returns the predefined value; selecting another piece of authentication information than the piece of authentication information already transmitted to the terminal; transmitting the selected piece of authentication information to the terminal. Furthermore, upon receiving the selected piece of authentication information, the terminal replaces the previously received piece of authentication information by the selected piece of authentication information. Thus, non-traceability of the accesses to the resource(s) by the terminal is ensured.

According to a particular feature, the authentication server performs: deriving, for each terminal, said piece(s) of authentication information from information received from said terminal; determining said checking function(s) on the basis of the determined respective piece(s) of authentication information. Furthermore, the terminal performs: deriving said piece(s) of authentication information from information provided by said terminal to the authentication server, identically as performed by the authentication server for said terminal. Thus, no transmission of said piece(s) of authentication information occurs, which limits the risk of one device intercepting said piece(s) of authentication information for later malicious usage of said piece(s) of authentication information.

According to a particular feature, each piece of authentication information obtained by the authentication server is a root of at least one checking function transmitted by the authentication server, and in that said predefined value is null. Thus, the method is easy-to-implement.

According to a particular feature, the authentication server transmits said checking function(s), or coefficients thereof, once the following steps of the method have been performed beforehand: receiving by the gateway device from the terminal a second request for getting access to the resource(s); requesting, by the gateway device, authentication by the authentication server for the terminal for getting access to the resource(s); granting access to the resource(s) upon successful authentication of the terminal for getting access to the resource(s). Thus, authentication offload is performed once authentication has been performed at least once by the authentication server for the terminal.

According to a particular feature, the authentication server performs: determining more than one checking function per terminal, each checking function is such that each piece of authentication information transmitted to the terminal is representative of a value such that, when inputted to each determined checking function, said determined checking function returns the predefined value; selecting another checking function than the checking function already transmitted to the gateway device; transmitting the selected checking function, or coefficients thereof, to the gateway device. Furthermore, upon receiving the selected checking function, or coefficients thereof, the gateway device replaces the previously received checking function, or coefficients thereof, by the selected checking function, or coefficients thereof. Thus, non-traceability of the accesses to the resource(s) by the terminal is reinforced.

According to a particular feature, at least first and second terminals being able to request getting access to the resource(s), the authentication server performs: determining at least one first checking function for the first terminal and a first set of any value that, when inputted to any first checking function, said first checking function returns the predefined value; determining at least one second checking function for the second terminal and a second set of any value that, when inputted to at least one of said second checking function(s), said second checking function(s) return(s) the predefined value. Furthermore, the intersection of the first and second sets is void. Thus, the risk of one terminal maliciously using a piece of authentication information of another terminal is limited or even avoided.

According to a particular feature, each checking function is in polynomial form or based on linear codes.

According to a particular feature, the authentication server transmits to the gateway device at least one checking function, or coefficients thereof, per terminal in conjunction with a temporary identifier, and the authentication server transmits to any terminal at least one piece of authentication information in conjunction with the temporary identifier. Thus, as the checking functions are applied by the gateway device per terminal, the authentication server doesn't need to update the checking functions when authentication offloading for more or less terminals has to be setup.

According to a particular feature, the gateway device allocates a first temporary identifier for identifying each terminal during communications between the gateway device and said terminal, and the authentication server transmits to the gateway device at least one checking function, or coefficients thereof, per terminal, said checking function being associated with a second temporary identifier shared by the gateway device and the authentication server, and the gateway device maintains a correspondence between the first and second temporary identifiers. Thus, malicious usage of the piece of authentication information by a non-authenticated terminal does not lead to the appropriate checking function.

According to a particular feature, the authentication server performs: determining at least one checking function per terminal; determining a global checking function per resource as a combination of said checking functions, the combination comprising at least one determined checking function per terminal; transmitting, for each resource, the global checking function, or coefficients thereof, to the gateway device. Furthermore, the gateway device performs, the first request being a request for getting access to a given resource: retrieving the global checking function for said given resource; inputting the piece of authentication information provided by the terminal into the retrieved global checking function, for obtaining the authentication result; accepting the first request for getting access to the given resource, when the authentication result equals said predefined value; and rejecting the first request for getting access to the resource(s), when the authentication result differs from said predefined value. Thus, as the checking functions are applied by the gateway device per resource, non-traceability of the accesses to the resource(s) by the terminal is reinforced.

According to a particular feature, for each resource, the global checking function is determined as a product of at least one checking function per terminal allowed to rightfully get access to said resource. Thus, the method is easy-to-implement.

According to a particular feature, for each resource, the global checking function is defined as a product of at least one checking function per terminal allowed to rightfully get access to said resource, multiplied by a supplementary function having no root. Thus, as the checking functions are applied by the gateway device per resource, non-traceability of the accesses to the resource(s) by the terminal is even more reinforced.

The present invention also concerns a system for authenticating at least one terminal requesting access to at least one resource, the system comprising an authentication server managing access to the resource(s) and a gateway device including means for routing data between the terminal(s) on one hand and, on the other hand, the authentication server and the resource(s). The system is such that the authentication server comprises: means for obtaining for each terminal at least one piece of authentication information; means for transmitting to the gateway device at least one checking function, or coefficients thereof; wherein each piece of authentication information is representative of a value such that, when inputted to respective checking function(s), the checking function(s) return(s) a predefined value. Furthermore, the system is such that the gateway device comprises: means for receiving a first request for getting access to the resource(s), said first request being received in conjunction with a piece of authentication information; means for retrieving a checking function applicable to the received request, from amongst the checking function(s) received from the authentication server; means for inputting the provided piece of authentication information into the retrieved checking function, for obtaining an authentication result; means for accepting the first request for getting access to the resource(s), implemented when the authentication result equals said predefined value; and means for rejecting the first request for getting access to the resource(s), implemented when the authentication result differs from said predefined value.

The present invention also concerns a computer program that can be downloaded from a communication network and/or stored on a medium that can be read by a processing device. This computer program comprises instructions for causing implementation of the aforementioned method, when said program is run by the processor. The present invention also concerns information storage means, storing a computer program comprising a set of instructions causing implementation of the aforementioned method, when the stored information is read from said information storage means and run by a processor.

Since the features and advantages related to the system and to the computer program are identical to those already mentioned with regard to the corresponding aforementioned method, they are not repeated here.

The characteristics of the invention will emerge more clearly from a reading of the following description of an example of embodiment, said description being produced with reference to the accompanying drawings, among which.

Although embodiments of the present invention are detailed hereafter with respect to a wireless telecommunications system, it shall be noted that the features of the present invention apply in a broader context of a communications system in which accesses to a resource are controlled by an authentication server via a gateway device.

Figure 1:
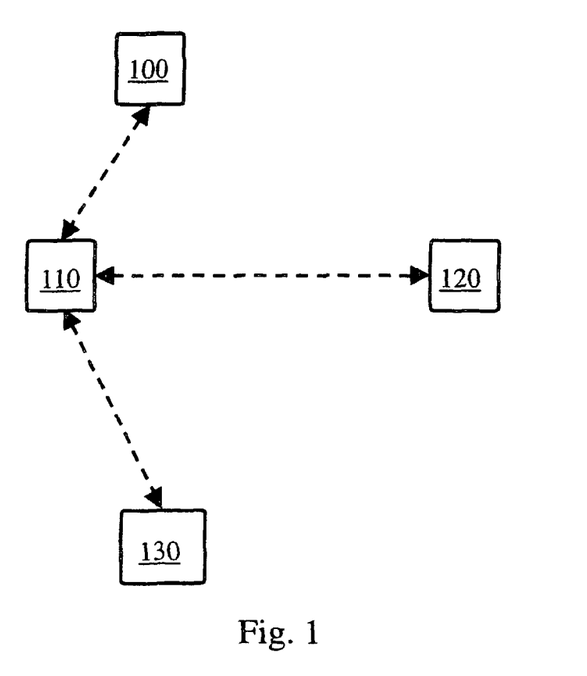
FIG. 1 schematically represents a wireless telecommunications system in which the present invention may be implemented.

FIG. 1 schematically represents a wireless telecommunications system in which the present invention may be implemented.

The wireless telecommunications system comprises an authentication server 100, a gateway 110, a device managing at least one resource 120 and at least one terminal 130. The gateway device 110 is adapted to communicate with the authentication server 100, with the device managing the resource(s) 120 and with the terminal(s) 130.

The authentication server 100 is in charge of authenticating devices requesting access to the resource(s) 120. The gateway device 110 is in charge of providing access to the resource(s) 120 to authenticated terminals. More than one gateway device may provide access to the resource(s) 120 to authenticated terminals. Requests for accessing the resource(s) 120 are transmitted by the terminal(s) 130 to the gateway device 110. The gateway device 110 requests to the authentication server 100 whether terminals are allowed to rightfully get access to the resource(s) 120. As detailed hereinafter, the gateway device 110 might not request authentication by the authentication server 100 for all and any terminals requesting access to the resource(s) 120.

The terminals 130 are for example mobile terminals of a radio telecommunications network, and the communications between the terminals 130 and the gateway device can be performed by using a wireless communication protocol.

The resource 120 is for example a wireless time and/or frequency resource, which means that the access control to the resource 120 relates to a hand-over procedure or to an establishment of cooperation schemes between two radio neighbours, such as CoMP (Coordinated Multipoint Transmission) in the 3GPP LTE specifications. According to another example, the resource 120 is a computational resource of a server for cyber-foraging applications, or cloud computing. Particularly suitable for M2M (Machine to Machine) communications, also referred to as MTC (Machine-Type Communications), the resource 120 may also be data stored on a data server or information stored by another terminal, like a sensor, or may be an application executed by another terminal.

In the particular case of 3GPP LTE networks, the gateway device 110 is preferably included in the eNodeB or Home eNodeB device, and the authentication server 100 is included in the MME (Mobility Management Entity) device, when the resource 120 is related to a hand-over procedure or to a connection to another terminal, i.e. UE in this case.

Figure 2:
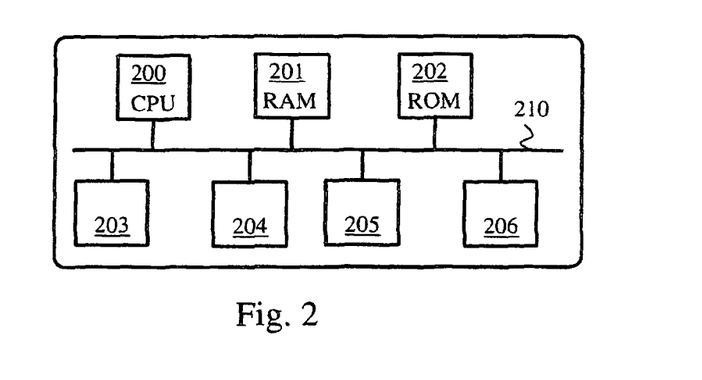
FIG. 2 schematically represents an architecture of a gateway device of the wireless telecommunications system.

FIG. 2 schematically represents an architecture of the gateway device 110. According to the shown architecture, the gateway device 110 comprises the following components interconnected by a communications bus 210: a processor, microprocessor, microcontroller or CPU (Central Processing Unit) 200; a RAM (Random-Access Memory) 201; a ROM (Read-Only Memory) 202; an HDD (Hard-Disk Drive) 203, or any other device adapted to read information stored by storage means; a first communication interface 204; a second communication interface 205; and a third communication interface 206.

The first communication interface 204 allows the gateway device 110 to communicate with the authentication server 100. For instance the first communication interface 204 is an S1 interface, as defined by the 3GPP specifications.

The second communication interface 205 allows the gateway device 110 to communicate with the resources 120. For instance the second communication interface 204 is an X2 interface, as defined by the 3GPP specifications.

The third communication interface 206 allows the gateway device 110 to communicate with the terminals 130. For instance the third communication interface 206 is a Uu interface, as defined by the 3GPP specifications.

The authentication 100 and/or the terminals 130 may be based on a similar architecture, wherein only the first communication interface 204 is necessary for the authentication server 100 to communicate with the gateway device 110, and wherein only the third communication interface 206 is necessary for the terminals 130 to communicate with the gateway device 110.

CPU 200 is capable of executing instructions loaded into RAM 201 from ROM 202 or from an external memory, such as an SD card or the HDD. After the gateway device 110 has been powered on, CPU 200 is capable of reading instructions from RAM 201 and executing these instructions. The instructions form one computer program that causes CPU 200 to perform the steps performed by the gateway device 110 in the algorithms described hereafter.

Any and all steps of the algorithms described hereafter may be implemented in software by execution of a set of instructions or program by a programmable computing machine, such as a PC (Personal Computer), a DSP (Digital Signal Processor) or a microcontroller; or else implemented in hardware by a machine or a dedicated component, such as an FPGA (Field-Programmable Gate Array) or an ASIC (Application-Specific Integrated Circuit).

Figure 3:
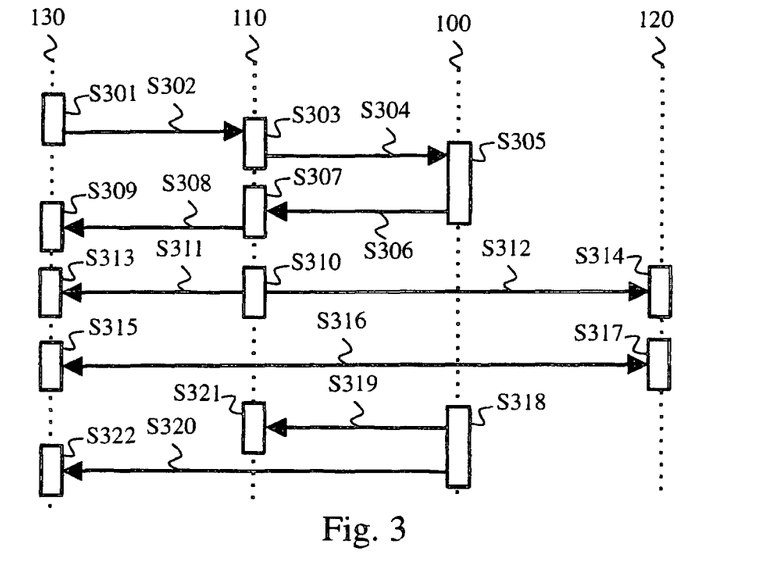
FIG. 3 schematically represents exchanges occurring in the wireless telecommunications system, when authentication is performed by an authentication server.

FIG. 3 schematically represents exchanges occurring in the wireless telecommunications system, when authentication is performed by the authentication server 100.

In a step S301, the terminal 130 detects a need to get access to the resource 120. In a following step S302, the terminal 130 transmits to the gateway device 110 a request for getting access to the resource 120. The request from the terminal 130 is received and processed by the gateway device 110 in a following step S303. The gateway device 110 detects that accessing the resource 120 by the terminal 130 requires authentication. In a following step S304, the gateway device 110 requests to the authentication server 100 whether the terminal 130 is allowed to rightfully get access to the resource 120. The request from the gateway device 110 is received and processed by the authentication server 100 in a following step S305. The authentication server 100 performs authentication of the terminal 130. If the authentication of the terminal 130 fails, the authentication server 100 rejects the request from the gateway device 110, which in turn rejects the request from the terminal 130. Let's consider the case where the authentication of the terminal 130 succeeds, i.e. the terminal 130 is allowed to rightfully get access to the resource 120. In other words, the authentication server 100 grants access to the resource 120. In a following step S306, the authentication server 100 transmits, to the gateway device 110, a positive response to the request received in the step S305. The response from the authentication server 100 is received and processed by the gateway device 110 in a following step S307. In a following step S308, the gateway device 110 transmits a positive response to the terminal 130. The response from the gateway device 110 is received and processed by the terminal 130 in a following step S309. The terminal 130 gets prepared for getting access to the resource 120.

In a step S310, the gateway device 110 gets prepared for allowing the terminal 130 to get access to the resource 120. The gateway device 110 transmits a first connection setup message to the terminal 130 in a step S311 and a second connection setup message to the device managing the resource 120 in a step S312. The first connection setup message is received and processed by the terminal 130 in a step S313, and the second connection setup message is received and processed by the device managing the resource 120 in a step S314. The terminal 130 and the device managing the resource 120 respectively configure themselves to setup a connection. In a step S316, the terminal 130 and the device managing the resource 120 exchanges messages representative of the terminal 130 accessing the resource 120. Such messages are processed by the terminal 130 and the device managing the resource 120 in respective steps S315 and S317.

Other procedures for effectively allowing the terminal 130 to get access to the resource 120 may be implemented instead of the steps S310 to S317. A connection may be setup directly between the terminal 130 and the device managing the resource 120, or the gateway device 110 may act as an intermediate device in such a connection thanks to its routing functionalities. Moreover, the gateway device 110 may send a request to setup such a connection to the device managing the resource 120, which in turn deals directly with the terminal 130 for effectively setting up the connection. Alternatively, the gateway device 110 may send a request to the device managing the resource 120 to unlock the access to the resource 120 for the terminal 130, which can then get access to the resource 120 once the response granting such access is received from the gateway device in the step S309.

In a step S318, the authentication server 100 checks whether conditions are fulfilled for offloading authentication toward the gateway device 110 for the terminal 130. For instance, the authentication server 100 checks whether a predetermined number of authentications has been successfully performed for the terminal 130. In another example, the authentication server 100 decides offloading the authentication once a successful authentication has been performed for the terminal 130.

When the conditions are fulfilled for offloading authentication toward the gateway device 110 for the terminal 130, the authentication server 100 transmits, in a step S319, to the gateway device 110 at least one checking function or coefficients thereof. The authentication server 100 further obtains, at least one piece of authentication information to be later on provided by the terminal 130 to request access to the resource 120, said piece(s) of authentication information being representative of a value such that, when inputted to the checking function(s), the checking function(s) return(s) a predefined value. The checking function allows the gateway device 110 to check on its own that the terminal 130 is allowed to rightfully get access to the resource 120, on the basis of said piece of authentication information when provided by the terminal 130. A first embodiment for determining the checking function and said piece of authentication information is detailed hereafter with regard to FIG. 5A, a second embodiment for determining the checking function and said piece of authentication information is detailed hereafter with regard to FIG. 5B and a third embodiment for determining the checking function and said piece of authentication information is detailed hereafter with regard to FIG. 6. Usage of the checking function by the gateway device 110 and of said piece of authentication information by the terminal 130 is detailed hereafter with regard to FIG. 4.

In one embodiment, the authentication server 100 determines said piece(s) of authentication information and transmits, in a step S320, to the terminal 130, said piece(s) of authentication information. The checking function, or coefficients thereof, is received and stored by the gateway device 110 in a step S321. The piece of authentication information is received and stored by the terminal 130 in a step S322.

In another embodiment, the authentication server 100 determines said piece(s) of authentication information from information received from the terminal 130. For instance, the authentication server 100 derives said piece(s) of authentication information from the International Mobile Subscriber Identity (IMSI) stored in a Subscriber Identity Module (SIM) connected to the terminal 130, as defined by the 3GPP specifications. Identically, the terminal 130 is able to derive said piece(s) of authentication information from the IMSI. There is therefore, in this embodiment, no need to transmit said piece(s) of authentication information from the authentication server 100 to the terminal 130. In this case, in the S320, the authentication server 100 transmits to the terminal 130 an information indicating that the terminal 130 shall now on transmit a piece of authentication information derived from the IMSI to the gateway device 110 when requesting to get access to the resource 120.

In a variant, instead of deciding offloading authentication following a successful authentication of the terminal 130, the authentication server 100 makes such a decision according to a criteria related to a processing load level of the authentication server 100. The steps S318 to S322 are then performed subsequently to a detection that said criteria is fulfilled.

Figure 4:
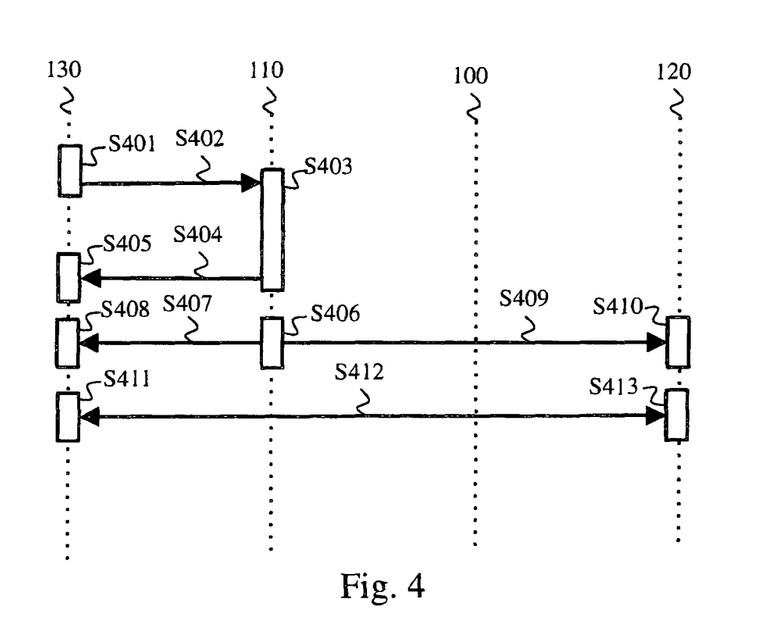
FIG. 4 schematically represents exchanges occurring in the wireless telecommunications system, when authentication is offloaded by the authentication server to the gateway device.

FIG. 4 schematically represents exchanges occurring in the wireless telecommunications system, when authentication is offloaded by the authentication server 100 to the gateway device 110.

In a step S401, the terminal 130 detects a need to get access to the resource 120. In a following step S402, the terminal 130 transmits to the gateway device 110 a request for getting access to the resource 120. The request is accompanied by the piece of authentication information previously received by the terminal 130 in the step 322. The request from the terminal 130, as well as the accompanying piece of authentication information, are received and processed by the gateway device 110 in a following step S403. The gateway device 110 detects that accessing the resource 120 by the terminal 130 requires authentication. The gateway device 110 further detects that authentication, in order for at least the terminal 130 to get access to the resource 120, has been offloaded by the authentication server 100 to the gateway device 110. The gateway device 110 then retrieves the checking function applicable for determining whether the terminal 130 is authorised to access the resource 120, from amongst the checking function(s) received from the authentication server 100. The gateway device 110 then inputs, to the retrieved checking function, the piece of authentication information provided by the terminal 130. If applying the checking function to the piece of authentication information provided by the terminal 130 results in the checking function outputting a predefined value, the authentication succeeds; otherwise, the checking function fails. As will be detailed hereafter, the predefined value is preferably null. When the authentication succeeds, the gateway device 110 accepts the request transmitted by the terminal 130; otherwise, the gateway device 110 rejects the request transmitted by the terminal 130. Let's consider the case where the authentication of the terminal 130 succeeds, i.e. the terminal 130 is allowed to rightfully get access to the resource 120. In other words, the gateway device 110 grants access to the resource 120. In a following step S404, the gateway device 110 transmits, to the terminal 130, a positive response to the request received in the step S403. The response from the gateway device 110 is received and processed by the terminal 130 in a following step S405.

In a step S406, the gateway device 110 gets prepared for allowing the terminal 130 to get access to the resource 120. The gateway device 110 transmits a first connection setup message to the terminal 130 in a step S407 and a second connection setup message to the device managing the resource 120 in a step S408. The first connection setup message is received and processed by the terminal 130 in a step S410, and the second connection setup message is received and processed by the device managing the resource 120 in a step S411. The terminal 130 and the device managing the resource 120 respectively configure themselves to setup a connection. In a step S412, the terminal 130 and the device managing the resource 120 exchange messages representative of the terminal 130 accessing the resource 120. Such messages are processed by the terminal 130 and the device managing the resource 120 in respective steps S411 and S413. As already mentioned with regard to FIG. 3, other procedures for effectively allowing the terminal 130 to get access to the resource 120 may be implemented instead of the steps S406 to S413.

Figure 5A:
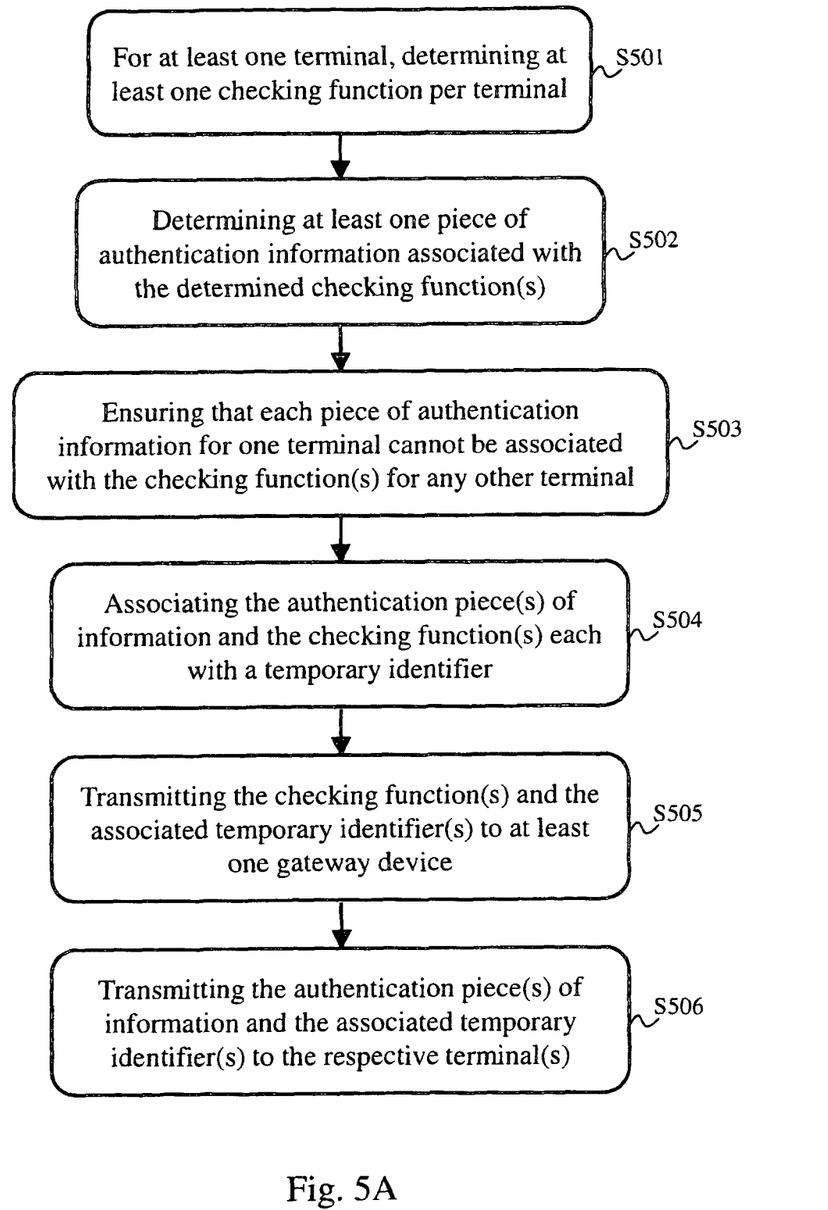
FIG. 5A schematically represents an algorithm performed by the authentication server for offloading authentication to the gateway device, according to a first embodiment.

FIG. 5A schematically represents an algorithm performed by the authentication server 100 for offloading authentication to the gateway device 110, according to the first embodiment.

In a step S501, the authentication server 100 determines at least one checking function per terminal 130 for which authentication is expected to be offloaded toward the gateway device 110.

In a step S502, for each terminal 130, the authentication server 100 determines at least one piece of authentication information associated with the determined checking function(s). For each terminal 130, each piece of authentication information is representative of a value such that, when inputted in any associated checking function, said associated checking function returns a predefined value.

Preferably, such predefined value is null, i.e. each piece of authentication information is representative of a root of the checking function.

In a variant, the steps S501 and S502 are inverted. In this case, the authentication server 100 determines at least one piece of authentication information per terminal 130, and then determines at least one checking function associated with the piece(s) of authentication information, wherein each piece of authentication information is representative of a value such that, when inputted in any associated checking function, said associated checking function returns a predefined value.

Considering a terminal i, let's denote $C_i$ a set consisting of all the values such that, when inputted in a checking function $f_i(\ )$, the checking function $f_i(\ )$ returns a predefined value $\alpha$, wherein, in a preferred embodiment, $\alpha=0$. Each piece of authentication information associated with the checking function $f_i(\ )$ is representative of a value x that solves the following system:

$$\begin{cases} \forall\, x \in C_i,\ f_i(x) = \alpha \\ \forall\, x' \notin C_i,\ f_i(x') \neq \alpha \end{cases}$$

Considering another terminal j, let's denote $C_j$ a set consisting of all the values such that, when inputted in a checking function $f_j(\ )$, the checking function $f_j(\ )$ returns the predefined value $\alpha$. In order to avoid that a piece of authentication information provided to the terminal i and used maliciously by the terminal j to get access to the resource 120 leads to the terminal j getting effectively access to the resource 120, the intersection of the sets $C_i$ and $C_j$ shall be void:

$$\forall (i,j),\ i \neq j,\ C_i \cap C_j = \emptyset$$

Therefore, in a step S503, the authentication server 100 ensures that each piece of authentication for one terminal cannot be associated with the checking function for another terminal.

In a following step S504, the authentication server 100 associates, per terminal 130, a temporary identifier with the piece(s) of authentication information for said terminal 130 and the checking function(s) for said terminal 130.

In a step S505, the authentication server 100 transmits at least one determined checking function, or coefficients thereof, to at least one gateway device, such as the gateway device 110. The authentication server 100 transmits one determined checking function, or coefficients thereof, for each terminal 130 for which authentication offload is allowed. In conjunction, the authentication server 100 transmits to the gateway device(s) the temporary identifier associated with each checking function.

Moreover, in conjunction, the authentication server 100 may transmit to the gateway device(s) the predefined value $\alpha$.

In a step S506, the authentication server 100 transmits at least one determined piece of authentication information to each terminal 130 for which authentication offload is allowed. In conjunction, the authentication server 100 transmits to the terminal(s) 130 the temporary identifier associated with each piece of authentication information.

Therefore, considering one terminal having received a temporary identifier i and another terminal having received a distinct temporary identifier j, and considering that the intersection of the sets $C_i$ and $C_j$ is void, a malicious usage of a piece of authentication information representative of a value $x \in C_i$ by the terminal having received the temporary identifier j would result in the request for getting access to the resource 120 being rejected.

The temporary identifier is said temporary in that the authentication server 100 is expected to modify the temporary identifier, either on a regular basis or upon detecting a predefined event. Such predefined event is for instance a detection of a terminal maliciously using a piece of authentication information, i.e. a piece of authentication information that doesn't lead the gateway device 110 obtaining the predefined value $\alpha$ when inputting said piece of authentication information in a checking function selected by the gateway device 110. When modifying the temporary identifier, the authentication server 100 transmits the newly defined temporary identifier to the gateway device(s) in conjunction with the checking function with which it is associated, and transmits to the terminal 130 at least the newly defined temporary identifier. For instance, the temporary identifier is the Temporary Mobile Subscriber Identity (TMSI) as defined by the 3GPP's mobility management specifications. TMSI is the identity that is most commonly sent between the mobile terminal and the wireless telecommunications network. TMSI is randomly assigned by the Visitor Location Register (VLR) to every mobile terminal in an area managed by said VLR, at the instant at which the mobile terminal is switched on. The extent of TMSI remains local to the area managed by said VLR, and hence TMSI is expected to be updated each time the mobile terminal moves to a different area. According to 3GPP's mobility management specifications, TMSI can further be changed at any time, in order to avoid the subscriber from being identified and tracked by eavesdroppers on the radio channel or in the wireless telecommunications system.

After execution of the algorithm of FIG. 5A, when the terminal 130 provides later on a piece of authentication information to the gateway device 110 in conjunction with a temporary identifier, the gateway device 110 applies the checking function, associated with said temporary identifier, to said piece of authentication information. When the checking function returns the predefined value $\alpha$, the authentication of the terminal 130 succeeds and the access to the resource(s) 120 is granted; otherwise, the authentication of the terminal 130 fails and the access to the resource(s) 120 is rejected.

Therefore, considering one terminal having received a temporary identifier i and another terminal not yet authenticated by the authentication server 100, a malicious usage of a piece of authentication information representative of a value $x \in C_i$ and of the temporary identifier i by said another terminal would result in the request for getting access to the resource 120 being rejected, in case of expiry of the validity of the temporary identifier i.

The algorithm of FIG. 5A ensures that the gateway device 110 is not aware of the true identity of the terminal 130 and that the gateway device 110 is not able to keep track of any resource to which the terminal 130 is allowed to get access. No tracking of the terminal 130 by the gateway device 110 is therefore enabled.

Figure 5B:
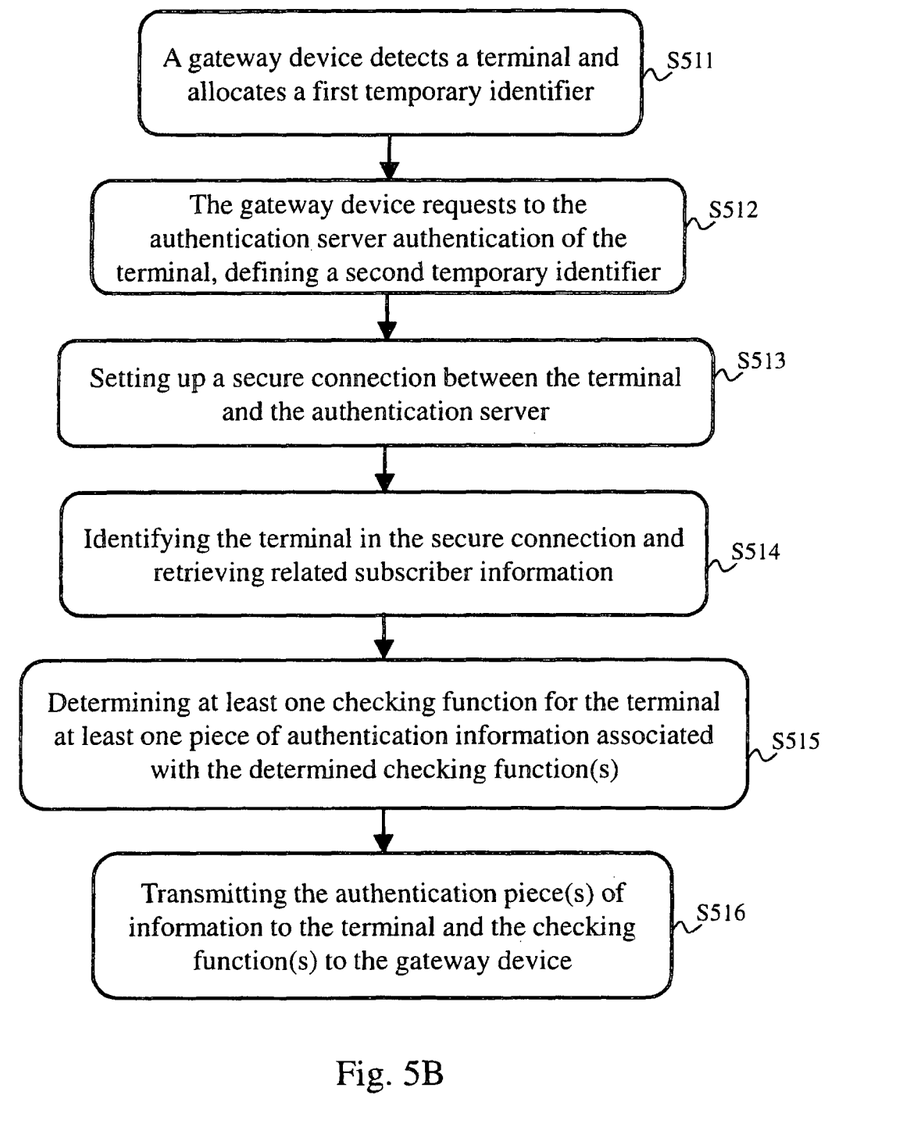
FIG. 5B schematically represents an algorithm performed by the authentication server for offloading authentication to the gateway device, according to a second embodiment.

FIG. 5B schematically represents an algorithm performed by the authentication server for offloading authentication to the gateway device, according to a second embodiment.

In a step S511, the gateway device 110 detects the presence of the terminal 130 in an area managed by the gateway device 110. The gateway device 110 then allocates a first temporary identifier to the terminal 130, which is then used to identify the terminal 130 during communications between the gateway device 110 and the terminal 130.

In a step S512, the gateway device 110 requests to the authentication server 100 authentication of the terminal 130. The gateway device 110 or the authentication server 100 allocates a second temporary identifier to the terminal 130, which is then used to identify the terminal 130 during communications between the gateway device 110 and the authentication server 100. The first and second temporary identifiers may be identical. When the first and second temporary identifiers are not identical, the gateway device 110 maintains a correspondence between the first and second identifiers.

In a step S513, the gateway device 110 allows setting up a secure connection between the terminal 130 and the authentication server 100. The secure connection allows the terminal 130 to provide to the authentication server information identifying a subscriber using the terminal, such as the TMSI or the IMSI. Then, in a following step S514, the authentication server 100 identifies this subscriber and retrieves related subscriber information, such as rights to access the resource(s) 120.

In a step S515, the authentication server 100 determines at least one checking function for the terminal 130 and determines at least one piece of authentication information associated with the determined checking function(s), as already described with regard to the steps S501 and S502.

In a step S516, the authentication server 100 transmits at least one determined checking function, or coefficients thereof, to the gateway device 110. The checking functions are therefore associated with the second temporary identifier. The authentication server 100 also transmits at least one determined piece of authentication information to the terminal 130 in the secure connection.

After execution of the algorithm of FIG. 5B, when the terminal 130 provides later on a piece of authentication information to the gateway device 110, the gateway device 110 retrieves the applicable checking function thanks to the first temporary identifier and the correspondence between the first and second identifiers. When the checking function returns the predefined value α, the authentication of the terminal 130 succeeds and the access to the resource(s) 120 is granted; otherwise, the authentication of the terminal 130 fails and the access to the resource(s) 120 is rejected.

Therefore, considering a malicious usage of a piece of authentication information representative of a value $x \in C_i$ associated to terminal i by a terminal j would result in the request for getting access to the resource 120 being rejected, as said piece of authentication information cannot be associated with the appropriate checking function.

As for the algorithm of FIG. 5A, the algorithm of FIG. 5B ensures that the gateway device 110 is not aware of the true identity of the terminal 130 and that the gateway device 110 is not able to keep track of any resource to which the terminal 130 is allowed to get access. No tracking of the terminal 130 by the gateway device 110 is therefore enabled.

It shall be understood from the description hereinbefore that more than one piece of authentication information may be determined by the authentication server 100 per terminal 130 for each associated checking function. It shall also be understood that more than one checking function may be determined by the authentication server 100 per terminal 130 for each associated piece of authentication information. It allows the authentication server 100 changing the piece of authentication information and/or the associated checking function for the terminal 130.

Two checking functions for one terminal 130 may have in common few input values that imply returning the predefined value α; therefore, changing the piece of authentication information for the terminal 130 allows asynchronously switching from one checking function $f_{i,1}(\ )$ to another $f_{i,2}(\ )$, by ensuring that the piece of authentication information used by the terminal 130 when switching is representative of a value x such that $x \in C_{i,1}$ and $x \in C_{i,2}$. Consistently with the description above, $C_{i,1}$ denotes a set consisting of all the values such that, when inputted in the checking function $f_{i,1}(\ )$, the checking function $f_{i,1}(\ )$ returns the predefined value α and $C_{i,2}$ denotes a set consisting of all the values such that, when inputted in the checking function $f_{i,2}(\ )$ the checking function $f_{i,2}(\ )$ returns the predefined value α. An illustrative example is shown in FIG. 7.

Figure 7:
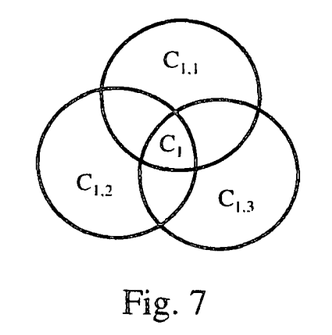
FIG. 7 schematically represents sets of roots of checking functions that can be used for offloading authentication from the authentication server to the gateway device for one terminal.

FIG. 7 schematically represents sets $C_{1,1}$, $C_{1,2}$, $C_{1,3}$ of roots of respective checking functions $f_{1,1}(\ )$, $f_{1,2}(\ )$, $f_{1,3}(\ )$ that can be used for offloading authentication from the authentication server 100 to the gateway device 110 for one terminal 130. Each set is schematically represented by a respective circle. As shown in FIG. 7, the sets $C^{1,1}$, $C_{1,2}$, $C_{1,3}$ partially overlap each other. The intersection $C_1$ of the sets $C_{1,1}$, $C_{1,2}$, $C_{1,3}$ therefore consists of the roots that are common to each checking function $f_{1,1}(\ )$, $f_{1,2}(\ )$, $f_{1,3}(\ )$. Thus, by selecting for the terminal 130 a piece of authentication information representative of a value $x \in C_1$, the authentication server 100 can select any checking function $f_{1,1}(\ )$, $f_{1,2}(\ )$, $f_{1,3}(\ )$. Situations, in which synchronisation of an update of the piece of authentication information by the terminal 130 and of the associated checking function by the gateway device 110 is not ensured, are then managed. Such situations occur for example when the terminal 130 falls into an idle mode period, during which the authentication server 100 performs an authentication offload update that is therefore not received by the terminal 130 in idle mode, and further when the awaking terminal 130 attempts to get access to the resource 120. If the piece of authentication information stored by the terminal 130 is representative of a value $x \in C_1$ at the instant at which the authentication server performs the authentication offload update, then the terminal 130 succeeds in getting access to the resource 120.

In other words, the authentication server 100 ensures that, before selecting a new checking function for the terminal 130 and requesting accordingly update by the gateway device 110, the terminal 130 stores a piece of authentication information that is representative of a value $x \in C_1$.

In a preferred embodiment, the authentication server 100 only provides to the terminal 130 pieces of authentication information that are representative of values $x \in C_1$. In the case where the terminal 130 derives the pieces of authentication information from the IMSI, the pieces of authentication information are preferably representative of values $x \in C_1$, which allows the authentication server 100 independently modifying the applicable checking function.

In this preferred embodiment, considering the case where a terminal i shall not receive a piece of authentication information that would lead to a successful authentication by using a checking function determined for another terminal j, the following constraint shall be met:

$$\forall (i, j), i \neq j, C_i \cap \left( \bigcup_k C_{j,k} \right) = \emptyset$$

Two checking functions for two respective terminals 130 may have in common some input values that imply returning the predefined value α; the pieces of authentication information transmitted to each terminal 130 shall however not be in common with the set of values that imply returning the predefined value α when inputted in any checking function associated with any other terminal 130. An illustrative example is shown in FIG. 8.

Figure 8:
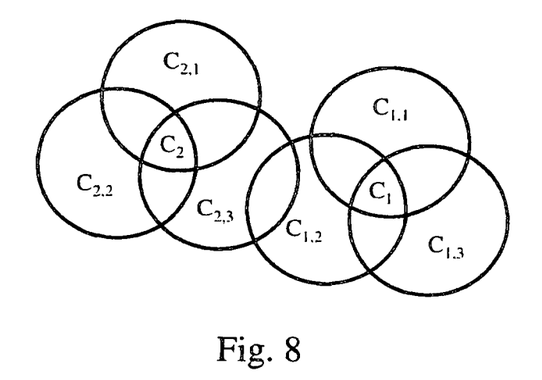
FIG. 8 schematically represents sets of roots of checking functions that can be used for offloading authentication from the authentication server to the gateway device for plural terminals.

FIG. 8 schematically represents sets $C_{1,1}$, $C_{1,2}$, $C_{1,3}$ of roots of respective checking functions $f_{1,1}(\ )$, $f_{1,2}(\ )$, $f_{1,3}(\ )$ that can be used for offloading authentication from the authentication server 100 to the gateway device 110 for a first terminal 130. FIG. 8 further schematically represents sets $C_{2,1}$, $C_{2,2}$, $C_{2,3}$ of roots of respective checking functions $f_{2,1}(\ )$, $f_{2,2}(\ )$, $f_{2,3}(\ )$ that can be used for offloading authentication from the authentication server 100 to the gateway device 110 for a second terminal 130. Each set is schematically represented by a respective circle. As shown in FIG. 8, the sets $C_{1,1}$, $C_{1,2}$, $C_{1,3}$ partially overlap each other. The intersection $C_1$ of the sets $C_{1,1}$, $C_{1,2}$, $C_{1,3}$ therefore consists of the roots that are common to each checking function $f_{1,1}(\ )$, $f_{1,2}(\ )$, $f_{1,3}(\ )$. Thus, by selecting for the first terminal 130 a piece of authentication information representative of a value $x \in C_1$, the authentication server 100 can select any checking function $f_{1,1}()$, $f_{1,2}()$, $f_{1,3}()$. Moreover, as shown in FIG. 8, the sets $C_{2,1}$, $C_{2,2}$, $C_{2,3}$ partially overlap each other. The intersection $C_2$ of the sets $C_{2,1}$, $C_{2,2}$, $C_{2,3}$ therefore consists of the roots that are common to each checking function $f_{2,1}()$, $f_{2,2}()$, $f_{2,3}()$. Thus, by selecting for the second terminal 130 a piece of authentication information representative of a value $x \in C_2$, the authentication server 100 can select any checking function $f_{2,1}()$, $f_{2,2}()$, $f_{2,3}()$. In addition, as shown in FIG. 8, the sets $C_{1,2}$ and $C_{2,3}$ overlap each other, but in such a way that the set $C_{1,2}$ does not overlap the set $C_2$ and that the set $C_{2,3}$ does not overlap the set $C_1$. Therefore, by transmitting to the first terminal 130 only pieces of authentication information representative of values $x \in C_1$, the authentication server 100 ensures that said pieces of authentication information do not result in a successful authentication in combination with any checking function $f_{2,1}()$, $f_{2,2}()$, $f_{2,3}()$; and by transmitting to the second terminal 130 only pieces of authentication information representative of values $x \in C_2$, the authentication server 100 ensures that said pieces of authentication information do not result in a successful authentication in combination with any checking function $f_{1,1}()$, $f_{1,2}()$, $f_{1,3}()$.

In other words, at least first and second terminals 130 being able to request getting access to the resource(s) 120, the authentication server 100 determines at least one first checking function for the first terminal and a first set $C_1$ of any value that, when inputted to any first checking function, said first checking function returns the predefined value. Moreover, the authentication server 100 determines at least one second checking function for the second terminal and a second set $C = C_{2,1} \cup C_{2,2} \cup C_{2,3}$ of any value that, when inputted to at least one of said second checking function(s), said second checking function(s) return(s) the predefined value. The authentication server 100 ensures that the intersection of the first $C_1$ and second C sets is void.

A first illustrative example for determining the checking functions and the respective pieces of authentication information is based on polynomial forms. Let's consider, consistently with the description above, that $C_{i,k}$ is the set of the roots of the checking function $f_{i,k}()$. The checking function $f_{i,k}()$ may then be expressed as follows:

$$f_{i,k}(x) = \prod_{m \in C_{i,k}} (x-m)^{q(m)} P_{i,k}(x)$$

wherein $q(m)$ is the order of the root $m$ of the checking function $f_{i,k}()$ and $P_{i,k}()$ is a polynomial with no input values resulting in $P_{i,k}()$ outputting the predefined value $\alpha$.

In this first illustrative example, it is considered that the sets $C_i$ and $C_{i,k}$ are already defined, wherein $i=0, \ldots, T-1$ is an index representing each one of T terminals 130. When the authentication server 100 needs to add another terminal 130, the authentication server determines a new set $C_T$ for said another terminal 130, wherein the intersection of the set $C_T$ with any already defined set $C_{i,k}$ is void. Let's denote A the union of all the already defined sets $C_{i,k}$, wherein $i = 0, \ldots, T-1$, such as:

$$A = \bigcup_i \bigcup_k C_{i,k}$$

Therefore $C_T$ is defined such that:

$$C_T \cap A = \emptyset$$

It allows ensuring that the values of the set $C_T$ don't result in that the already defined checking functions $f_{i,k}()$ output the predefined value $\alpha$ when any one of said values is inputted in said already defined checking functions $f_{i,k}()$.

Let's further denote B the union of all the already defined sets $C_i$, wherein $i=0, \ldots, T-1$, such as:

$$B = \bigcup_i C_i$$

The authentication server 100 determines further values to form the sets $C_{T,k}$.

Let's further denote $C'_{T,k}$ the sets such that:

$$C'_{T,k} \cup C_T = C_{T,k}$$

$$C'_{T,k} \cap B = \emptyset$$

The authentication server 100 determines the polynomials $P_{T,k}()$ with no input values resulting in the polynomials $P_{T,k}()$ outputting the predefined value $\alpha$. Then, the authentication server determines the checking functions $f_{T,k}()$ such that:

$$f_{T,k}(x) = \prod_{m \in C_T} (x-m) \prod_{m' \in C'_{T,k}} (x-m')^{q(m)} P_{T,k}(x)$$

Then, the authentication server 100 adds the set $C_T$ to B and the sets $C_{T,k}$ to A, and is then ready to add another new terminal 130.

A second illustrative example for determining the checking functions and the respective pieces of authentication information is based on linear codes.

Let's consider a linear code L of cardinality $2^M$ built from an M×N generator matrix G, wherein M<N. Therefore, any value l belonging to L satisfies $l = qG$, wherein q is an M-length binary word belonging to a set Q. Let's further denote H the N×(N-M) parity matrix of G, such that:

$$GH = 0$$

The authentication server 100 decomposes the set Q into $Q_k$ subsets such that their intersection is not void:

$$\bigcap_k Q_k \neq \emptyset$$

Then, the authentication server 100 can determine the piece(s) of authentication information as being representative of the value(s) belonging to L such that: $l' = q'G$, with q' value(s) belonging to the intersection of the subsets $Q_k$. Let's denote L' the set of the values l'.

Considering a terminal 130 identified by an index i among a plurality of T terminals 130, wherein $i=0, \ldots, T-1$. The authentication server 100 determines the piece(s) of authentication information for said terminal 130 as being a shifted codeword $l_{i,k}$ such that:

$$l_{i,k} = l_k + t_i$$

wherein $l_k$ represents the binary codewords corresponding to the values belonging to the subsets $Q_k$ and $t_i$ is an N-length binary word not belonging to L, and which does not correspond to any shifted codeword $l_{j,k}$ used for any other terminal j. As a sum of one codeword of the linear code and of one codeword not belonging to the linear code results in obtaining a codeword not belonging to the linear code, there is no overlap between the values $l_{i,k}$ for different values of the index i.

The authentication server 100 then provides to the gateway device 110 the parity matrix H as well as the value $t_i$ or a value $r_i$ such that:

$$r_i = t_i H$$

Then, upon receiving a piece of authentication information from the terminal 130 identified by the index i, the gateway device 110 verifies that the following condition is fulfilled:

$$l_{i,k} H + r_i = 0$$

wherein $l_{i,k} H + r_i$ represents the checking function $f_{i,k}()$.

When this condition is fulfilled, the terminal 130 is considered as authenticated by the gateway device 110.

It shall be understood from the description above that a set of appropriate checking functions can be predetermined by the authentication server 100 for each terminal, and the authentication server 100 then selects adequate couples of checking functions and pieces of authentication information on the basis of this set. Alternatively, the authentication server 100 may dynamically define the couples of checking functions and pieces of authentication information. The authentication server 100 then ensures that at least one former piece of authentication information that can still be used by the concerned terminal 130 works with the newly defined checking function, in order to compensate a non synchronised application of the change by the gateway device 110 and the concerned terminal 130. Similarly, the authentication server 100 ensures that at least one former checking function that can still be used by the gateway device 110 for the concerned terminal 130 works with the newly defined piece of authentication information. It further means that the set $C_i$ may evolve over time.

Figure 6:
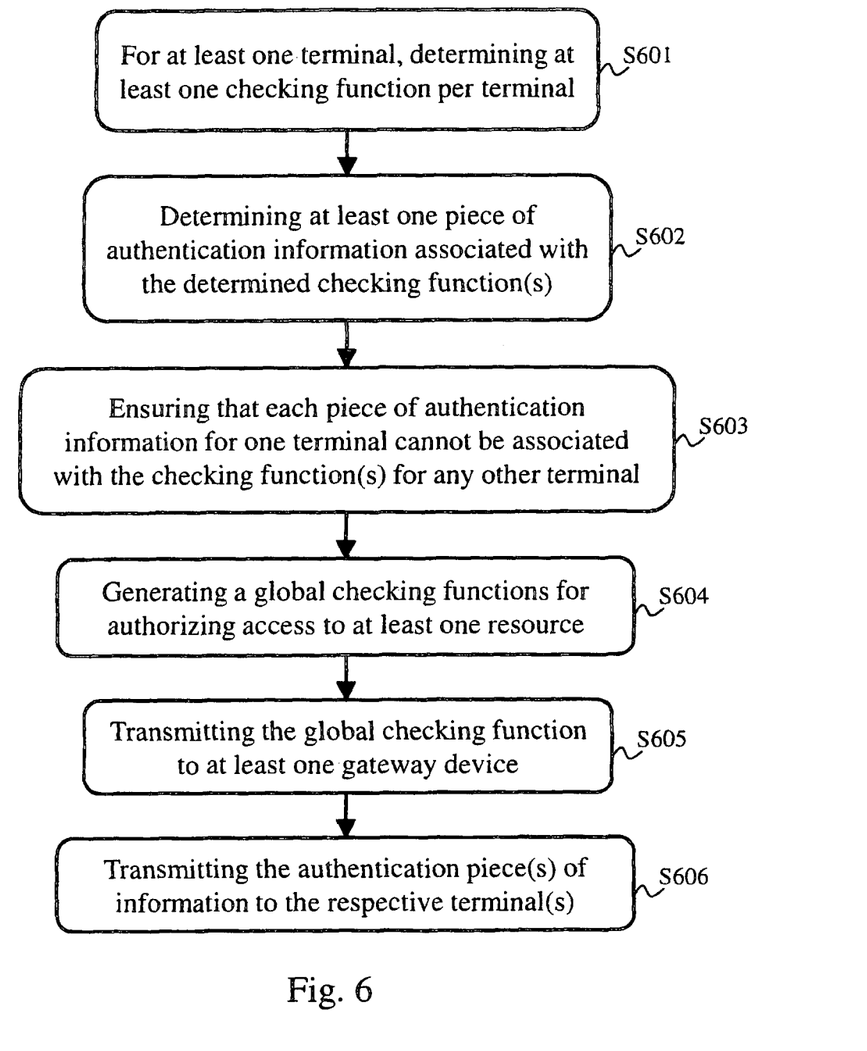
FIG. 6 schematically represents an algorithm performed by the authentication server for offloading authentication to the gateway device, according to a third embodiment.

FIG. 6 schematically represents an algorithm performed by the authentication server 100 for offloading authentication to the gateway device 110, according to a third embodiment.

In this third embodiment, there is no need to associate a temporary identifier with the checking function(s) and with the piece(s) of authentication information. Consequently, the checking functions (referred to hereafter as unitary checking functions) for plural respective terminals 130 are not independently transmitted to the gateway device 110, but are rather combined to form a global checking function associated with the resource 120, which is then transmitted, or coefficients thereof, to the gateway device 110.

In a step S601, the authentication server 100 determines at least one checking function per terminal 130 for which authentication is expected to be offloaded toward the gateway device 110.

In a step S602, for each terminal 130, the authentication server 100 determines at least one piece of authentication information associated with the determined checking function(s). For each terminal 130, each piece of authentication information is representative of a value such that, when inputted in any associated checking function, said associated checking function returns the predefined value $\alpha$.

Preferably, the predefined value $\alpha$ is null, i.e. each piece of authentication information is representative of a root of the checking function.

In a step S603, the authentication server 100 ensures that each piece of authentication for one terminal cannot be associated with the checking function for another terminal, which means, consistently with the notations already used:

$$\forall(i,j), i \neq j, C_i \cap C_j = \emptyset$$

The steps S601, S602 and S603 are identical to the respective steps S501, S502 and S503 of the algorithm of FIG. 5A, which means that the same variants apply, including the variants described hereinbefore with regard to FIGS. 7 and 8. Following execution of the steps S601, S602 and S603, unitary checking functions are determined for each terminal 130 authorized to get access to the resource 120.

In a step S604, the authentication server 100 generates a global checking function as a combination of plural unitary checking functions, the combination comprising at least one unitary checking function per terminal 130 authorized to get access to the resource 120. The global checking function is such that, considering a value inputted in one of the plural unitary checking functions leads said unitary checking function outputting the predefined value $\alpha$, said inputted value further leads the global checking function outputting a predefined value $\beta$.

Let's consider a first terminal 130 and a second terminal 130, with unitary checking functions and pieces of authentication information defined as previously described and shown in FIG. 8. Let's denote g( ) the global checking function and let's consider that the authentication server 100 decides selecting the unitary checking function $f_{1,1}()$ for the first terminal 130 and the unitary checking function $f_{2,3}()$ for the second terminal 130. Then the global checking function g( ) is defined as a combination of the unitary checking functions $f_{1,1}()$ and $f_{2,3}()$, and for any value $x \in C_1$ or $x \in C_2$, $g(x) = \beta$.

Preferably, the predefined value $\beta$ is null, i.e. each piece of authentication information is representative of a root of the checking function.

According to a particular embodiment, the predefined value $\beta$ is null and the global checking function g( ) is defined as the product of the unitary checking functions $f_i()$ selected by the authentication server 100 among the checking functions $f_{i,k}()$ for the respective terminals 300 authorized to get access to the resource 120:

$$g(\ ) = \prod_i f_i(\ )$$

According to a particular embodiment, the predefined value $\beta$ is null and the global checking function g( ) is defined as the product of the unitary checking functions $f_i()$ selected by the authentication server 100 for the respective terminals 300 authorized to get access to the resource 120, multiplied by a supplementary function h( ) that doesn't have any root:

$$\begin{cases} \forall x, h(x) \neq 0 \\ g(\ ) = h(\ ) \cdot \prod_i f_i(\ ) \end{cases}$$

According to a more particular embodiment, the authentication server 100 changes the supplementary function h( ) each time the authentication server 100 adds, suppresses or modifies at least one of the unitary checking functions $f_i()$ defining the global checking function g( ). This feature reinforces the non-traceability of the terminals 130 by the gateway device 110.

In a step S605, the authentication server 100 transmits the determined global checking function, or coefficients thereof, to at least one gateway device, such as the gateway device 110. Moreover, in conjunction, the authentication server 100 may transmit to the gateway device(s) the predefined value β.

In a step S606, the authentication server 100 transmits at least one determined piece of authentication information to each terminal 130 for which authentication offload is allowed.

As for any unitary checking function as described hereinbefore, the authentication server 100 may change the global checking function over time.

After execution of the algorithm of FIG. 6, when the terminal 130 provides later on a piece of authentication information to the gateway device 110, the gateway device 110 applies the global checking function to said piece of authentication information. When the global checking function returns the predefined value β, the authentication of the terminal 130 succeeds and the access to the resource 120 is granted; otherwise, the authentication of the terminal 130 fails and the access to the resource 120 is rejected.

According to a particular embodiment, the embodiments described hereinbefore with regard to FIGS. 5A and 6, or the embodiments described hereinbefore with regard to FIGS. 5B and 6, may be combined. In this case, when the terminal 130 provides a piece of authentication information to the gateway device 110, the gateway device 110 checks the piece of authentication information with both the unitary checking functions $f_i(\ )$ and the global checking function $g(\ )$. In this case, the check performed with the unitary checking functions $f_i(\ )$ allows authenticating the terminal 130 and the check performed with the global checking function $g(\ )$ allows determining whether the terminal 130 is allowed to rightfully access the resource 120.

The invention claimed is:

1. A method for authenticating at least one terminal requesting access to at least one resource, the access to the at least one resource being managed by an authentication server and a gateway device that routes data between the at least one terminal, the authentication server, and the at least one resource, the method comprising:
    performing by the authentication server,
        authenticating each of the at least one terminal for initial access to the at least one resource,
        after authenticating each of the at least one terminal, offloading to the gateway device responsibility for authenticating the authenticated terminal for future access to the at least one resource by,
        determining for the authenticated terminal first and second pieces of authentication information;
        transmitting the first piece of authentication information to the authenticated terminal, and subsequently transmitting the second piece of authentication information to the authenticated terminal, wherein upon receiving the second piece of authentication information the authenticated terminal replaces the first piece of authentication information with the second piece of authentication information;
        transmitting to the gateway device multiple checking functions, or coefficients thereof, corresponding to the authenticated terminal,
    wherein each piece of authentication information is representative of a value such that, when inputted to a corresponding checking function, the corresponding checking function returns a predefined value, and
    wherein each of the multiple checking functions returns a same predefined value when either the first or the second piece of authentication information is inputted thereto; and
    performing by the gateway device,
        receiving from a particular one of the at least one terminal a first request for getting access to the at least one resource, said first request being received in conjunction with a piece of authentication information provided by the particular terminal;
        retrieving a checking function applicable to the received request, from amongst the at least one checking function received from the authentication server corresponding to the particular terminal;
        inputting the piece of authentication information provided by the particular terminal into the retrieved checking function, for obtaining an authentication result;
        accepting the first request for getting access to the at least one resource, when the authentication result equals said predefined value; and
        rejecting the first request for getting access to the at least one resource, when the authentication result differs from said predefined value.

2. The method according to claim 1, wherein each piece of authentication information obtained by the authentication server is a root of at least one checking function transmitted by the authentication server, and in that said predefined value is null.

3. The method according to claim 1, wherein the authentication server transmits the at least one checking function, or the coefficients thereof, after the following has been performed beforehand:
    the gateway device has received from the terminal a second request for getting access to the at least one resource;
    the gateway device has requested authentication by the authentication server for the terminal for getting access to the at least one resource;
    granting access to the at least one resource upon successful authentication of the terminal for getting access to the at least one resource.

4. The method according to claim 1, wherein the authentication server further performs:
    determining more than one checking function per terminal, each checking function is such that each piece of authentication information transmitted to the terminal is representative of a value such that, when inputted to each determined checking function, said determined checking function returns the predefined value;
    selecting a checking function different from a checking function already transmitted to the gateway device;
    transmitting the selected checking function, or coefficients thereof, to the gateway device, and
    wherein, upon receiving the selected checking function, or the coefficients thereof, the gateway device replaces the checking function already transmitted, or coefficients of the previously received checking function, by the selected checking function, or the coefficients thereof.

5. The method according to claim 1, wherein at least first and second terminals are able to request getting access to the at least one resource,
    wherein the authentication server further performs:
        determining at least one first checking function for the first terminal and a first set of any value that, when inputted to any first checking function, said first checking function returns the predefined value;
determining at least one second checking function for the second terminal and a second set of any value that, when inputted to at least one of said at least one second checking function, said at least one second checking function returns the predefined value, and
wherein an intersection of the first and second sets is void.

6. The method according to claim 1, wherein each checking function is in polynomial form or based on linear codes.

7. The method according to claim 1, wherein the authentication server transmits to the gateway device one or more checking functions, or coefficients thereof, per terminal in conjunction with a temporary identifier, and in that the authentication server transmits to any terminal at least one piece of authentication information in conjunction with the temporary identifier.

8. The method according to claim 1, wherein the gateway device allocates a first temporary identifier for identifying each terminal during communications between the gateway device and said terminal,
wherein the authentication server transmits to the gateway device one or more checking functions, or coefficients thereof, for each terminal, said one or more checking functions for each terminal being associated with a second temporary identifier shared by the gateway device and the authentication server, and
wherein the gateway device maintains a correspondence between the first temporary identifier and the second temporary identifier.

9. The method according to claim 1, wherein the authentication server further performs:
determining at least one checking function per terminal;
determining a global checking function per resource as a combination of said checking functions, the combination comprising at least one determined checking function per terminal;
transmitting, for each resource, the global checking function, or coefficients thereof, to the gateway device, and
wherein the first request is a request for getting access to a given resource, and
wherein the gateway device further performs:
retrieving the global checking function for said given resource;
inputting the piece of authentication information provided by the terminal into the retrieved global checking function, for obtaining the authentication result;
accepting the first request for getting access to the given resource, when the authentication result equals said predefined value; and
rejecting the first request for getting access to the given resource, when the authentication result differs from said predefined value.

10. The method according to claim 9, wherein, for each resource, the global checking function is determined as a product of at least one checking function per terminal authorized to gain access to said resource.

11. The method according to claim 10, wherein, for each resource, the global checking function is defined as a product of at least one checking function per terminal authorized to gain access to said resource, multiplied by a supplementary function having no root.

12. A system for authenticating at least one terminal requesting access to at least one resource, the system comprising an authentication server managing access to the at least one resource and a gateway device including means for routing data between the at least one terminal, the authentication server, and the at least one resource, the system comprising:
an authentication server programmed to,
authenticate each of the at least one terminal for initial access to the at least one resource,
after authenticating each of the at least one terminal, offload to the gateway device responsibility for authenticating the authenticated terminal for future access to the at least one resource by,
determining for the authenticated terminal first and second pieces of authentication information;
transmitting the first piece of authentication information to the authenticated terminal, and subsequently transmitting the second piece of authentication information to the authenticated terminal, wherein upon receiving the second piece of authentication information the authenticated terminal replaces the first piece of authentication information with the second piece of authentication information;
transmitting to the gateway device at least one checking function, or coefficients thereof, corresponding to the authenticated terminal,
wherein each piece of authentication information is representative of a value such that, when inputted to a corresponding checking function, the corresponding checking function returns a predefined value, and
wherein each of the multiple checking functions returns a same predefined value when either the first or the second piece of authentication information is inputted thereto; and
a gateway device programmed to,
receive from a particular one of the at least one terminal a first request for getting access to the at least one resource, said first request being received in conjunction with a piece of authentication information provided by the particular terminal;
retrieve a checking function applicable to the received first request, from amongst the at least one checking function received from the authentication server corresponding to the particular terminal;
input the provided piece of authentication information into the retrieved checking function, for obtaining an authentication result;
accept the first request for getting access to the at least one resource, implemented when the authentication result equals said predefined value; and
reject the first request for getting access to the at least one resource, implemented when the authentication result differs from said predefined value.

* * * * *